ized: Jun. 24, 1986

United States Patent [19]
Johnson

[11] Patent Number: 4,597,015
[45] Date of Patent: Jun. 24, 1986

[54] IMAGE SENSITIVITY FOR SHUTTERED SOLID-STATE IMAGER TELEVISION CAMERA

[75] Inventor: Cydney A. Johnson, Burlington, N.J.

[73] Assignee: RCA Corporation, Princeton, N.J.

[21] Appl. No.: 604,976

[22] Filed: Apr. 27, 1984

[51] Int. Cl.$^4$ .............................................. H04N 5/30
[52] U.S. Cl. .................................... 358/225; 358/213
[58] Field of Search ............... 358/212, 213, 225, 223, 358/250

[56] References Cited

U.S. PATENT DOCUMENTS

| 4,161,000 | 7/1979 | Cleveland | 358/225 |
| 4,171,529 | 10/1979 | Silberberg et al. | 358/225 |
| 4,301,476 | 11/1981 | Keller | 358/225 |
| 4,363,034 | 12/1982 | Grancoin et al. | 358/213 |
| 4,504,866 | 3/1985 | Saito | 358/225 |

FOREIGN PATENT DOCUMENTS 2152687A 8/1985 United Kingdom .

OTHER PUBLICATIONS

U.S. Patent Appln. SN 575,570, filed 1/31/84 in names of S. L. Bendell & C. A. Johnson entitled: Exposure Time Control for a Solid-State Color Camera.

Primary Examiner—Gene Z. Rubinson
Assistant Examiner—L. C. Schroeder
Attorney, Agent, or Firm—Eugene M. Whitacre; Peter M. Emanuel; Lawrence C. Edelman

[57] ABSTRACT

A television camera includes a solid-state imager which forms a signal representative of an image during an integration interval. The integration interval is followed by a pull-down interval during which the integrated signal is transferred out of the photo-responsive region of the solid state imager. A first shutter is provided which periodically prevents light from falling upon the photo-responsive region of the imager during the pull-down interval. A second shutter in combination with the first shutter is controllable for limiting the light passage during the integration interval. With this shutter arrangement, the dynamic resolution of the camera is increased at the expense of image sensitivity. By the present invention, means are provided for precisely controlling the second shutter such that image sensitivity can be restored when desired.

21 Claims, 7 Drawing Figures

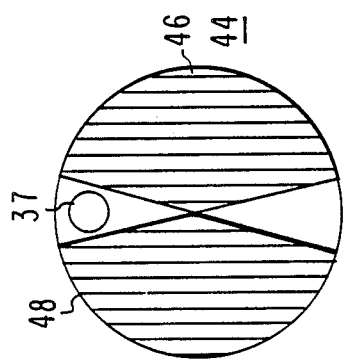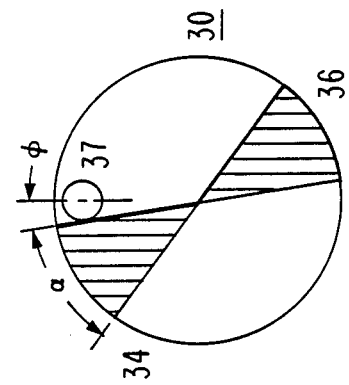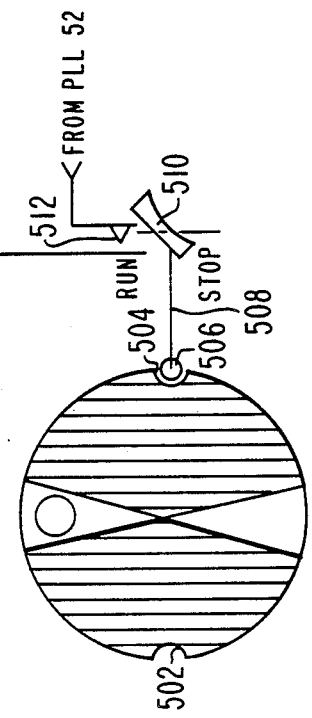

IMAGE SENSITIVITY FOR SHUTTERED SOLID-STATE IMAGER TELEVISION CAMERA

The present invention relates to a solid-state imager television camera including a shutter arrangement which reduces blurring for moving objects (e.g., provides high dynamic resolution) and, more particularly, to means for controlling the shutter arrangement for improving the image sensitivity of the camera.

BACKGROUND OF THE INVENTION

In a tube-type color camera the effective exposure time is 1/30th of a second, comprised of two interlaced fields of 1/60th of a second each. One of the drawbacks in tube-type cameras is that they exhibit low resolution when picking up fast moving objects (i.e., they have low dynamic resolution). In the past an optical shutter has been evaluated in such cameras to shorten the exposure time, however, the results have not been impressive due to the lag characteristics of tube-type sensors.

A solid-state imager typically has zero lag and, therefore, is a good sensor for picking up fast moving objects. With such a zero lag device it is now feasible to use optical shuttering to enhance the dynamic resolution of cameras using such devices. In a frame transfer (also known as a field-transfer) charge-coupled device (CCD) imager, it is generally considered to be necessary that the imager be optically shuttered during the interval (vertical blanking) in which the charge accumulated in the imaging area of the device is transferred to the storage area of the device. Failure to shutter during this period causes vertical image smear, most noticeable when picking up scenes containing highlights. In a frame transfer CCD imager, the effective exposure time is 1/60th of a second due to the method of signal readout. Interposing a mechanical shutter (e.g., a rotating wheel) between the main camera lens and the prism system can eliminate frame transfer smear and can also achieve an amount of optical shuttering during a charge accumulation interval of the CCD imager which enhances the dynamic resolution of the camera.

In U.S. patent application Ser. No. 575,570, filed on Jan. 31, 1984, in the names of S. L. Bendell and the present inventor, a solid-state imager camera is disclosed which includes a shutter arrangement for controlling the exposure time of the imagers. In accordance with this prior arrangement, a first shutter including opaque areas is rotated to block radiant energy from reaching the imagers during a fixed, relatively narrow, interval during the charge transfer period of the imager for eliminating vertical smear. A second shutter is arranged in series with the first shutter such that the combined effective width of the shutters may be adjusted to improve the resolution of moving images. With this arrangement, the light passage by the shutter system can be reduced to a slit, to enhance the dynamic resolution of the camera to a point where "true" stop motion of an image during action sequences can be realized. Furthermore, such a shutter system permits automatic exposure time control of a solid-state imager camera. The two shutters are arranged coaxially. One shutter motor is locked to vertical sync while the other shutter motor, which is also locked to vertical sync, is provided with a variable phasing control. Variation of the relative phase of the two shutters changes the effective exposure time.

A variable shutter exposure control permits the camera operator to select different exposure techniques for artistic or special-effect purposes. Unfortunately, as the exposure time is reduced, the charge accumulation of the CCD photosensor is also reduced, lowering the light sensitivity performance of the camera (i.e., the low light level performance is degraded). In a television camera including such a shutter system, it is desirable to be able to selectively improve the light sensitivity of the camera, especially under low light level conditions.

SUMMARY OF THE INVENTION

In accordance with the principles of the present invention, means are coupled to the second shutter for selectively causing the combination of the first and second shutters to block light during substantially only the image transfer interval, thereby improving the light sensitivity performance of the camera. In a preferred embodiment, a precision motor stopping control circuit is coupled to the second shutter motor to stop the second shutter from rotating at a precise position wherein it does not block light from reaching the solid-state imager.

BRIEF DESCRIPTION OF THE DRAWING

In the drawing:

FIGS. 3a–c illustrate the details of the shutter arrangement in accordance with one embodiment of the present invention;

FIG. 5 illustrates an alternative embodiment of a shutter arrangement for a solid-state imager camera in accordance with the principles of the present invention.

DETAILED DESCRIPTION OF THE PREFERRED EMBODIMENTS

Figure 1:
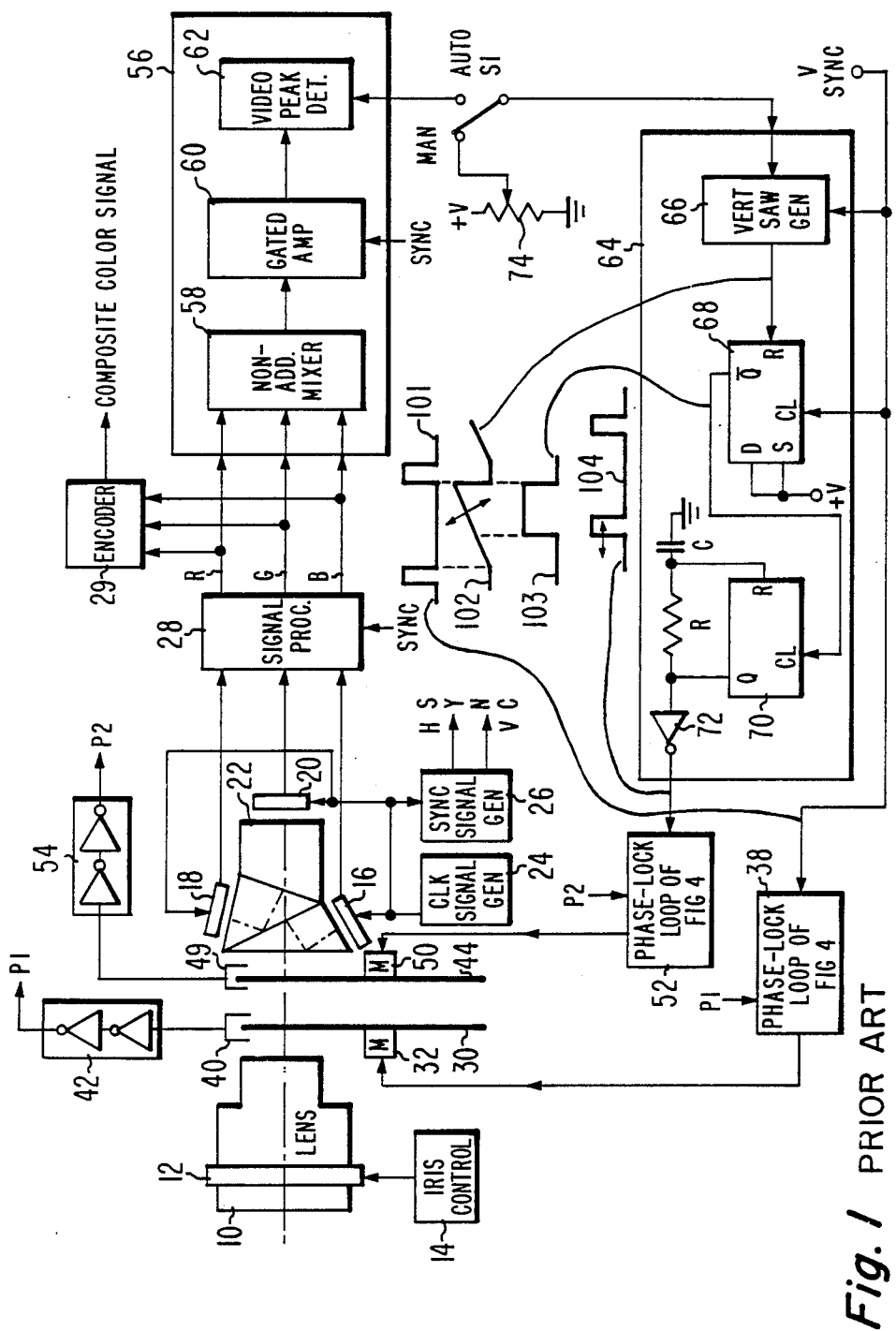
FIG. 1 illustrates, partially in block diagram form and partially in schematic diagram form, a prior art solid-state imager camera including a shutter system, a three-port color splitting prism and three solid-state imagers.

In FIG. 1 a prior art solid-state imager television camera is shown. The camera includes a zoom lens 10 with an iris 12 which is controlled by iris control 14. The lens focuses a scene (not shown) onto the surfaces of a blue-responsive solid-state imager 16, a red-responsive imager 18 and a green-responsive imager 20, positioned at the light output ports of a light-splitting prism 22.

Iris 12 controls the relative amount of light that passes through lens 10 by controlling the effective lens aperture diameter. When the scene is bright, the iris contracts to permit less light to pass through and when the scene is dimly lighted the iris expands to permit more light to come in. Another important feature of the iris is to control the depth of field of the scene, i.e., the distance between the nearest object of the scene in focus and the farthest object in focus. By controlling the iris opening manually and controlling the exposure time by other means, one may enhance the artistic features of a television camera.

Each of the solid-state imagers 16, 18, 20 may be of the charge-coupled device (CCD) frame transfer type (also known as a field transfer CCD) which include a photosensitive "A" register onto which light is focused and in the surfaces of which photoelectrons are generated. Of course, it should be realized that the present invention is not limited to frame-transfer CCDs, as other solid-state imagers may be used. The photoelectrons are constrained within vertical channels on the imager. Vertical motion of the accumulated image representative charge is controlled by polyphase (or biphase or uniphase) clock voltages applied to control electrodes from a clock signal generator 24. After an integrating or a charge accumulation period, the clock signals are activated to produce transfer of the electrons into the corresponding portions of a "B" register which is free from light influence. The accumulated charge which resides under the control electrodes of the "B" register is clocked line by line in parallel from the "B" register to a "C" register, by clock signals applied to the clock electrodes of the "B" register from the clock signal generator 24. Image representative signals are clocked out of the "C" register in serial fashion in response to the polyphase "C" clock signals from clock signal generator 24. The clocking signal generator 24 is coupled to a sync signal generator 26 which generates horizontal (H) and vertical (V) synchronizing signals used in a television signal.

The red (R), green (G) and blue (B) output signals from imagers 16, 18 and 20 are applied to a signal processor 28 which may include, black level correction, clamps, shading, gamma correction, matrixing circuits and other types of standard signal processing. The R, G, B signals are matrixed to form Y, I, Q signals. The color representative I and Q components are quadrature-modulated onto a subcarrier to form a composite signal such as NTSC or PAL signal. The output of the sync signal generator is also applied to signal processor 28 so as to insert synchronizing, blanking, equalizing and burst signals.

A shutter 30 including opaque areas is rotated by a motor 32 so that the opaque areas alternately pass between lens 10 and prism 22 as the shutter rotates. Referring to FIG. 3a, the details of shutter 30 are shown. The shutter includes two opaque areas 34 and 36 of approximately 20° each which block light from the imagers when interposed in the light path. Motor 32 is coupled to a reference signal from a phase-lock loop (PLL) 38 for maintaining the shutting off of light by the shutter opaque areas in synchronism with the A/B register charge transfer (pull-down) interval for the imagers. A position sensor 40 senses the angular speed and phase of shutter 30 and is coupled to PLL 38 via a pulse shaper 42 (illustrated as two inverters) for controlling motor 32 for maintaining the synchronism of the shutter.

In order to shutter the imagers during each pulldown interval (thereby eliminating vertical smear), the opaque areas of the shutter are disposed 180° apart (it should be noted that the shutter may include less than or more than two opaque areas. Illustratively, the camera described herein will use two opaque areas for reasons of inherent dynamic balance and reduced motor bearing wear). Each opaque area shutters the imager once during each half-rotation of the shutter or once during each field interval. The approximate angular sector $\alpha$ subtended by each of the two areas includes a first angular portion proportional to 180° in the same ratio as the pull-down time $t_{pd}$ is to the field interval time $t_f$, plus a second angular portion representing twice the angular width $\phi$ of a light cone 37 to be cut, $$\alpha = \frac{t_{pd}}{t_f}(180°) + 2\phi$$

For providing exposure time control, a second shutter 44 is arranged in series with shutter 30. By varying the relative phase of the two shutters the effective exposure time of the camera can be adjusted for providing special effects such as stop motion or the like. As illustrated in FIG. 3b, shutter 44 also includes two areas 46 and 48 which are opaque so that light is blocked from reaching the imagers when interposed in the light path 37. The transmissive areas between opaque areas 46 and 48 are wide enough to pass light cone 37 when shutter 44 is not rotating. Opaque areas 46 and 48 may have the same angle as the areas of shutter 30, or may be substantially large (e.g., approximately 130°) as illustrated in FIG. 3b. A motor 50 is coupled to receive a reference signal from a PLL 52 for controlling the rotational speed and phase of shutter 44. A position sensor 49 senses the angular speed and phase of shutter 44 and is coupled to PLL 52 via a pulse shaper 54 for controlling motor 50 for maintaining the synchronism of the shutter.

Shutters 30 and 44 are arranged coaxially but coaxial arrangement is not necessary. Shutter 30 is locked to the vertical sync signal and shutter 42 which is also locked to vertical sync has a variable phasing control for varying the amount of shuttering performed by the combined shutter. The action of varying the relative phase of the two shutters changes the effective exposure time $t_e$, such as illustrated by FIG. 3c. For example, for the exact phase alignment of two identical 70° shutters (70° opaque, 110° transmissive) the exposure time for a field is (180°-70°) out of 180° or 0.0102 seconds. If the shutters are misphased completely (140° opaque, 40° transmissive) the effective exposure time is 0.0037 seconds. This gives a time exposure range of about 2.8 times. If, on the other hand, the opaque angle of each shutter blade is equal to 80° the exposure range would be increased to 5 times. Shutter 44 illustrated in FIG. 3b includes opaque areas 46 and 48 substantially larger than opaque areas 34 and 36 of shutter 30 for providing a substantially fixed minimum exposure time which results in a maximum dynamic resolution for the camera.

Figure 4:
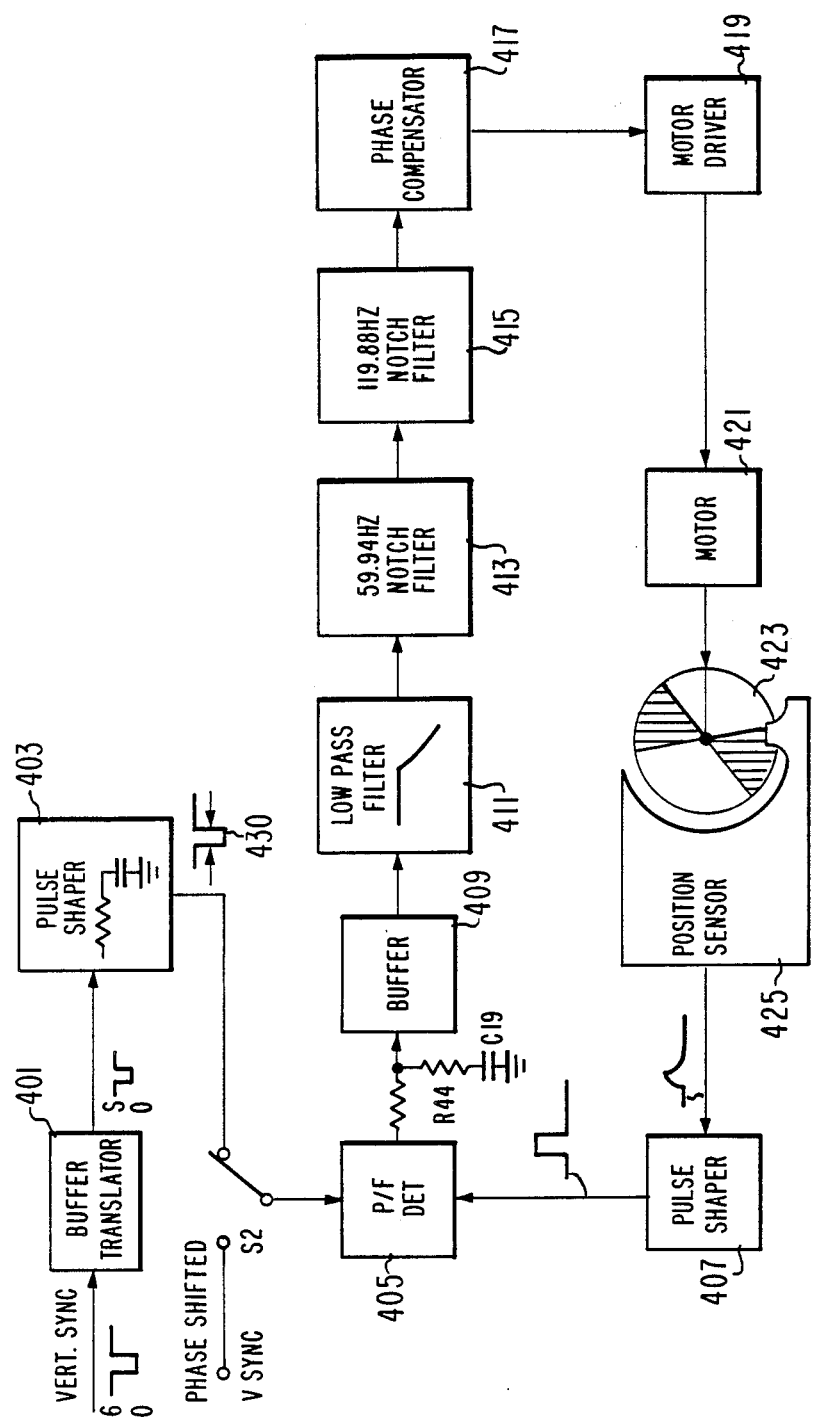
FIG. 4 illustrates, partially in block diagram form and partially in schematic diagram form, a circuit for providing servo control of the cameras illustrated in FIGS. 1 and 2.

The speed and phase of each of shutters 30 and 44 are controlled by PLLs 38 and 52 of two control loops which will be explained with reference to FIGS. 1 and 4. FIG. 4 includes a switch S2 soley for the convenience of illustrating PLLs 38 and 52 in a single FIGURE. First, the servo control for shutter 30 which blocks light during the critical pull-down interval will be explained with reference to FIG. 4. The reference signal for the servo loop for shutter 30 is derived from the vertical sync pulse, hence switch S2 is placed in the position illustrated in FIG. 4. The vertical sync pulse is delivered to buffer translator 401 which is used for level shifting and isolating the servo shutter circuit from the vertical drive distribution bus. The buffered vertical sync is delivered to pulse shaper 403. The gates of pulse shaper 403 are used to generate a narrow negative-going pulse illustrated as 430 whose positive going edge transition is used as a reference time by phase/frequency comparator 405. Phase/frequency comparator 405 generates an error signal (update pulses) to establish and update the shutter motor to a constant speed and consistent phase relative to the pull-down interval. The phase is necessary to position the shutter in such a matter that no light falls on the "A" register of the CCD when the transfer of the video signal is made from the "A" to the "B" register during the vertical interval. This error signal is related to the difference in the timing of two pulses, one from pulse shaper 403 which is a stable reference and another which is the feedback pulse from pulse shaper 407. Illustratively, phase/frequency detector 405 may be phase comparator II of an RCA 4046 phase comparator. The reference and feedback pulse signals are applied to phase/frquency detector 405, such that its output is high when the motor speed is low and low when the motor speed is high. When reference speed is obtained, the output is a negative or positive-going pulse whose duration is related to the phase duration between the reference signal and the feedback signal. When both the frequency and the phase are locked-up, the output of the phase/frequency detector is an open circuit. Capacitor C19 maintains the average DC level while phase/frequency detector 405 is open circuited. The time constant of R44 and C19 are such that the update pulse signal may be applied directly to buffer 409. Buffer 409 presents a high impedance to the output of the phase/frequency detector 405. The output from buffer 409 is delivered to low pass filter 411. Low pass filter 411 has a cutoff frequency in the region of the fundamental of the shutter speed to reduce the noise applied to the motor at high frequencies. The output from low pass filter 411 is applied to notch filters 413 and 415 in serial fashion. These outputs which are notched at approximately 60 and 120Hz to keep any residue from the update pulses from being directly applied to the motor, thus aiding in eliminating motor jogging and singing. The output from notch filter 415 is applied to phase compensator 417. Phase compensator 417 is a phase lead compensator which compensates for phase errors effectively damping the mechanical system thus providing stability to the servo loop. The output from phase compensator 417 is delivered to motor driver 419 which in turn drives motor 421 and shutter 423 (corresponding to either shutter 30 or shutter 44 of FIG. 1). A position sensor 425 is arranged to detect a reference position of shutter 423 to provide a signal related to the speed and phase of the shutter. The output from position sensor 425 is delivered to pulse shaper 407 which provides a squared-up pulse which is the feedback pulse to phase/frequency detector 405. Thus, the phase-lock loop of FIG. 4 maintains the reference position of rotating shutter 423, as established by the position sensor, so that the reference position is reached at the instant of the reference timing pulse edge.

Referring again to FIG. 1 shutter 44 is normally controlled by the signal output from signal processor 28. In other words, the phasing of shutter 44 is controlled relative to that of shutter 30 to control the exposure time of the overall shutter system. In this arrangement, illustrative switch S2 of FIG. 4 is positioned so that a phase shifted vertical sync signal (reference signal) is delivered to phase/frequency detector 405 to form PLL 52 of FIG. 1. It should be noted that for each shutter a separate servo arrangement would be required.

The material that follows will describe the generation of a phase-shifted reference pulse 104 for PLL 52 for control of the second shutter, i.e., shutter 44. The R, G, B signals from signal processor 28 are supplied to a block 56 for generating a signal representative of scene brightness. Block 56 includes a nonadditive mixer 58, which selects the signal of the largest value for delivery to a gated amplifier 60. Gated amplifier 60 selects a portion of the signal from near the center of the picture for exposure control. Horizontal and vertical synchronizing pulses are delivered to gated amplifier 60 for use in selecting the centered value. The output from gated amplifier 60 is delivered to a video peak detector 62. In an automatic arrangement, as described now, it is assumed that the iris control would be set at some fixed value and that the exposure control would be performed by control of the phasing of the shutters. Therefore, in this arrangement switch S1 would be switched to the automatic (AUTO) position. The signal from video peak detector 62 is delivered to a phase shifted 64 which shifts the phase of the vertical sync pulses 101 by an amount responsive to the DC level of the signal provided by block 56. Phase shifter 64 includes a vertical saw generator 66 which provides at its output a variable ramp signal having a slope that varies as a function of the magnitude of the signal at its input. Waveform 102 illustrates the variable ramp signal. The vertical sync pulses are applied to the clock (CL) input terminal of a $\overline{\text{D}}$ flip-flop (FF) 68 to set or latch a $\overline{\text{HIGH}}$ (a low) at the $\overline{\text{Q}}$ output terminal. The output from vertical saw generator 66 is applied to the reset input of flip flop 68. When the vertical saw output reaches a predetermined threshold value, FF68 resets and the $\overline{\text{Q}}$ output (illustrated by waveform 103) which was set low changes state to a high level which is delivered to the clock input of an astable flip flop 70. The Q output of flip flop 70 is a pulse, the duration of which is controlled by an R-C timing network, which is delivered to the input of an inverter 72. The output of inverter 72 is a reference pulse, signal illustrated in waveform 104 which is phase shifted from vertical sync and is delivered via switch S2 (of FIG. 4) to the phase/frequency detector 405 of PLL 52 for use in controlling the speed and phase of shutter 44. The details of the PLL 38 controlling shutter 30 will not be explained since it has already been explained with reference to PLL 52.

In operation, PLL 52 controls the reference position of rotating shutter 44 so that the reference position is reached at the timing of the positive-going edge of phase-shifted pulse 104. Thus, by changing the position of pulses 104 relative to pulses 101, the relative position of the shutter may be varied. Thus, one shutter, i.e. 30, has its speed and phase controlled by the vertical sync pulse of a television signal while the other shutter, i.e., 44, is controlled based on light in the scene. In another arrangement switch S1 of FIG. 1 may be switched to the manual position (MAN) wherein the phasing of shutter 44 is controlled manually by a DC level from a potentiometer 74 so that in this arrangement, for example, the iris servo control can be used for the exposure control while the shutter servo is maintained in a fixed position.

Figure 2:
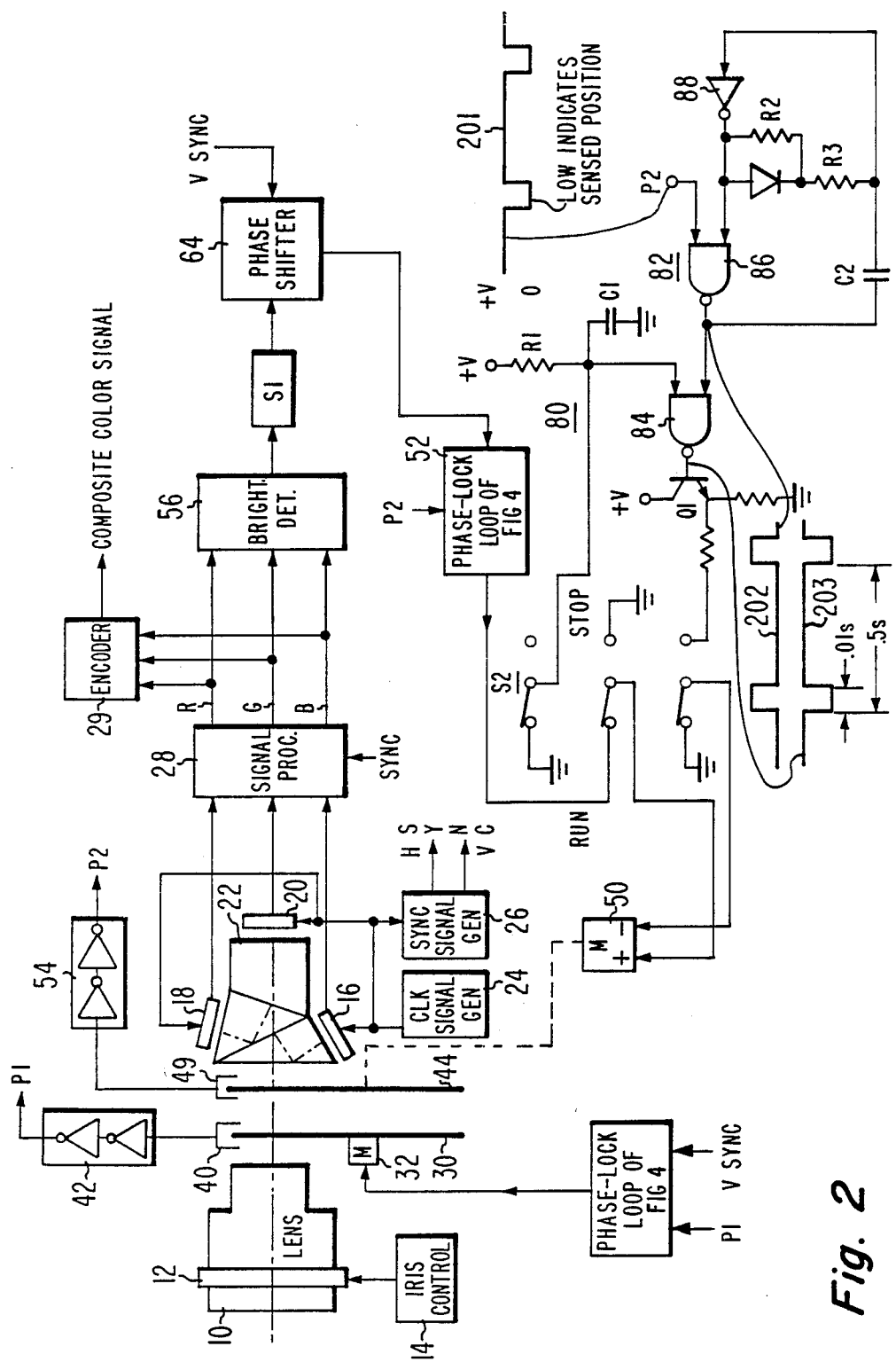
FIG. 2 illustrates, partially in block diagram form and partially in schematic diagram form, a solid-state imager camera arrangement in accordance with the principles of the present invention.

In the prior art television camera described above, the second shutter is used for decreasing the exposure time of the imagers and hence increasing the dynamic resolution of the television camera. Unfortunately, when dynamic resolution of the television camera is increased by an exposure control arrangement, its image sensitivity is correspondingly decreased. In accordance with the principles of the present invention, the second shutter is selectively operated so that maximum sensitivity can be restored to the television camera. FIG. 2 shows a camera system constructed in accordance with the principles of the present invention. In this FIGURE, elements designated with like reference numerals are the same as in FIG. 1 and their further description will therefore not be repeated. In the FIG. 2 embodiment, a precision motor stopping circuit 80 is shown for stopping the rotation of shutter 44 in a predetermined position such that neither of opaque areas 46 or 48 block light comb 37 from reaching prism 22. Motor stopping circuit 80 includes a three-pole, double-position switch S2 and a gated low frequency oscillator 82. When switch S2 is placed in the RUN position, the update pulses from PLL 52 are applied to the positive input terminal of motor 50 (motor 50 is shown displaced from its position illustrated in FIG. 1, as indicated by the dashed line, in order that the positive and negative terminals of motor 50 may be more clearly shown). When switch S2 is placed in the STOP position, the voltage on capacitor C1 begins to increase as determined by the time constant of R1 and C1. Until a threshold level is reached at the input of NAND gate 34, the output of gate 84 is high and a transistor Q1 conducts, coupling a positive voltage to the negative input of motor 50, causing it to slow down. When the increasing voltage on capacitor C1 reaches the threshold level of a high at the input of gate 84, the output of gate 84 becomes low, causing transistor Q2 to cease conduction. The time constant R1, C1 is picked to nearly stop the rotation of shutter 44 by motor 50.

Pulse shaper 54 provides a position indication signal P2 as indicated by waveform 201 and is applied to one input of a NAND gate 86 for enabling at its output the pulse output of low frequency oscillator 82. The output of gate 86 is also coupled to the input of an inverter 88 via a feedback capacitor C2 for forming low frequency oscillator 82. The pulse signal provded at the output of gate 86 is indicated by waveform 202 and has a pulse width of approximately 0.01 seconds and a period of approximately 0.05 seconds. A diode D1 parallels a resistor R2 and is in series with a resistor R3 connected between the input and output of inverter 88, as well known by those skilled in the art, for establishing the frequency and duty factor of waveform 202. The pulses from low frequency oscillator 82 are inverted by NAND gate 84 to form a pulse signal, indicated by waveform 203, which selectively causes conduction of transistor Q1 for approximately 0.01 seconds each half second. Each conduction causes an incremental (approximately 3° rotation) of shutter 44 until position sensor 50 senses a predetermined rotational position for shutter 44 which indicates that its opaque areas are not blocking the light path from the lens 10 to the prism 22. At this time, the P2 signal, which is also applied to an input of gate 86, goes low (as indicated by waveform 201) and disables the application of the low frequency pulses from gated oscillator 82 to the input of gate 84. Consequently, transistor Q1 remains nonconductive and no further incrementing of motor 50 occurs. Thereafter, due to, for example, motor friction and inertia, shutter 44 remains in a position for not blocking light. Since shutter 30 is controlled to only block light from reaching the images during the pull-down interval, it does not block light during the charge accumulation interval of the imagers and its rotation is therefore not stopped. Thus, the exposure time of the radiant energy to the imagers will not be limited by the action of shutters 30 or 44, and the maximum sensitivity is restored to the television camera.

FIG. 5 illustrates an alternative, mechanical arrangement for precisely stopping the rotation of shutter 44 at a desired position. Shutter 44 includes cutouts 502 and 504 in is periphery. A roller 506 is pushed by a shaft 508 by force supplied shaft 508 by a rocker switch 510 when it is pushed to the STOP position, such as indicated in FIG. 5. Roller 506 will roll along the periphery of shutter 44 causing considerable friction each time cutouts 502 and 504 are reached. Roller 506 will quickly cause shutter 44 to cease rotation when roller 506 becomes lodged in one of cutouts 502 and 504. When switch 510 is pressed into the RUN position, roller 506 is removed from either one of the cutouts 502 and 504 of shutter 44 and a contact 512 causes the update pulses from PLL 52 (of FIG. 2) to be coupled to motor 50 for controlling the rotation of shutter 44.

While the principles of the present invention have been demonstrated in both mechanical and electronic arrangements, it will be realized that various departures from such illustrative structures may be undertaken in practice of the invention. For example, the widths of the opaque areas of the two shutters may be made equal, if desired. Although this may reduce the range of the exposure control for the camera, with equal shutters synchronous and in-phase rotation of both shutters can be used in place of stopping the rotation of shutter 44 for restoring image sensitivity. That is, under these conditions, shutter 44 will block no more light then that blocked by shutter 30. If, however, shutter 44 includes large opaque areas, as indicated in FIG. 3b, precision stopping of shutter 44 would be required to restore the image sensitivity to the television camera. Furthermore, while the described arrangements may be especially advantageous for television cameras including solid-state images, they may also be applicable to television cameras including pickup-tubes.

What is claimed is:

1. A television camera, comprising:
    image transducing means including a photosensitive surface for generating signal in response to radiant energy received from a scene;
    first rotating shutter means arranged to block radiant energy from said scene from reaching said photosensitive surface during a fixed portion of each of recurrent television fields, resulting in predetermined performance levels of image sensitivity and dynamic resolution for said camera;
    second rotating shutter means arranged to operate in combination with said first rotating shutter means such that said shutter means combination blocks radiant energy from said scene from reaching said photosensitive surface during a portion of each of said recurrent television fields which is larger than said fixed portion, resulting in an image sensitivity performance level for said camera which is reduced from said predetermined performance level of sensitivity and a dynamic resolution performance level for said camera which is increased from said predetermined performance level of dynamic resolution;
    exposure control means coupled to control the relative rotational position between said first and said second rotating shutter means for controllably varying said portion of each of said recurrent television fields which is larger than said fixed portions, during which radiant energy is blocked by said shutter combination, for effecting a variable exposure control for said camera as said larger portion is variably controlled; and switch means coupled to said exposure control means for selectively stopping the rotation of said second rotating shutter means at a rotational position which does not block radiant energy from reaching said photosensitive surface while not effecting the rotation of said first rotating shutter means and its blocking of radiant energy during said fixed portion of each of said recurrent television fields, thereby restoring said camera image sensitivity and dynamic resolution to said predetermined performance levels.

2. The camera according to claim 1 where in said first and second shutter means each comprise a rotating shutter, and said exposure control means comprises a servo control for said second shutter for maintaining the rotational speed of said second shutter the same as the rotational speed of said first shutter and for providing a variable phase difference therebetween.

3. A camera according to claim 2 wherein said first and second shutters each include substantially equal opaque areas for blocking radiant energy.

4. The camera according to claim 2 wherein said first and second rotating shutters each include at least one opaque area for blocking radiant energy, said second shutter including an opaque area larger than the opaque area of said first shutter.

5. A camera according to claim 4 wherein said switch means comprises;

position sensing means coupled to said second shutter for providing a position signal when said shutter reaches a predetermined rotational positon wherein said shutter does not block radiant energy from reaching said image transducing means;

a gated low frequency oscillator responsive to said position signal for providing low frequency pulses until said position signal is provided, and a switch for coupling said low frequency pulses to control the rotation of said second shutter in place of said exposure control means, for incrementally rotating said second shutter until said predetermined rotational position is reached.

6. The camera according to claim 5 wherein said image transducing means is a charge-coupled device.

7. The camera according to claim 6 wherein said charge-coupled device is a frame transfer imager.

8. The camera according to claim 7 wherein at least a part of said fixed portion of said recurrent television fields is the transfer interval when signal is transferred from an imaging area of said device to a storage area of said device.

9. The camera according to claim 8 wherein said larger portion of said recurrent television fields includes at least a part of the charge accumulation interval during which charge is accumulated in said imaging area of said device.

10. A camera, comprising:

image transducing means including a photosensitive surface for generating signal in response to received radiant energy from a scene;

a first shutter including relatively narrow opaque areas for blocking radiant energy from said scene from reaching said photosensitive surface during at least a portion of the vertical retrace interval of a television field;

first motor means, coupled to said first shutter, for driving said first shutter;

first servo control means, coupled to said first motor means, for maintaining a predetermined speed and phase of said first shutter;

a second shutter including relatively wide opaque areas arranged with said first shutter for increasing that portion of a television field during which radiant energy is blocked to include at least a portion of the vertical trace interval of a television field;

second motor means, coupled to said second shutter, for driving said second shutter;

second servo control means, coupled to said second motor means, for maintaining the speed and phase of said second shutter with respect to said first shutter to establish that increased portion of a television field during which radiant energy is blocked;

position sensing means coupled to said second shutter for providing a position signal when said shutter reaches a predetermined rotational positon wherein said second shutter does not block radiant energy from reaching said image transducing means;

a gated low frequency oscillator responsive to said position signal for providing low frequency pulses until said positon signal is provided; and a switch for decoupling said second servo control means from said second motor means and for coupling said low frequency pulses to control the rotation of said second shutter for incrementally rotating said second shutter until said predetermined rotational position is reached.

11. The camera according to claim 10 wherein said image transducing means is a charge-coupled device.

12. The camera according to claim 11 wherein said charge-coupled device is a frame transfer imager.

13. The camera according to claim 12 wherein at least a part of said portion of a television field is the transfer interval during which signal is transfered from an imaging area of said device to a storage of said device.

14. The camera according to claim 13 wherein said larger portion of said recurrent television fields includes at least a part of the charge accumulation interval during which charge is accumulated in said imaging area of said device.

15. A camera, comprising:

image transducing means including a photosensitive surface for generating signal in response to radiant energy received from a scene;

first shutter means operated so as to block radiant energy from said scene from reaching said photosensitive surface during a fixed portion of each of recurrent television fields;

second shutter means arranged to operate in combination with said first shutter means such that said shutter means combination blocks radiant energy from said scene from reaching said photosensitive surface during a portion of each of said recurrent television fields which is larger than said fixed portion;

exposure control means coupled to said second shutter means for controllably varying said portion of each of said recurrent television fields which is larger than said fixed portions during which radiant energy is blocked by said shutter combination; and switch means coupled to said exposure control means for selectively stopping the operation of said second shutter means so it does not block radiant energy from reaching said photosensitive surface while not effecting the operation of said first shutter means and its blocking of radiant energy during said fixed portion of each of said recurrent television fields.

16. The camera according to claim 15 wherein said first and second shutter means each comprise a rotating shutter, and said exposure control means comprises a servo control coupled to said second shutter for maintaining the rotational speed of said second shutter the same as the rotational speed of said first shutter and for providing a variable phase difference therebetween.

17. A camera according to claim 16 wherein said switch means selectively uncouples said exposure control means from controlling the rotation of said second shutter and causes said second shutter to stop rotation at a position which does not block radiant energy from reaching the photosensitive surface of said image transducing means.

18. The camera according to claim 15 wherein said image transducing means is a charge-coupled device.

19. The camera according to claim 18 wherein said charge-coupled device is a frame transfer imager.

20. The camera according to claim 19 wherein at least a part of said fixed portion of said recurrent television fields is the transfer interval when signal is transferred from an imaging area of said device to a storage area of said device.

21. The camera according to claim 20 wherein said larger portion of said recurrent television fields includes at least a part of the charge accumulation interval during which charge is accumulated in said imaging area of said device.

* * * * *